Jan. 24, 1967        D. M. PETERSON ET AL        3,300,003
                UNIDIRECTIONAL CLUTCH MECHANISM
                      Filed Nov. 25, 1964
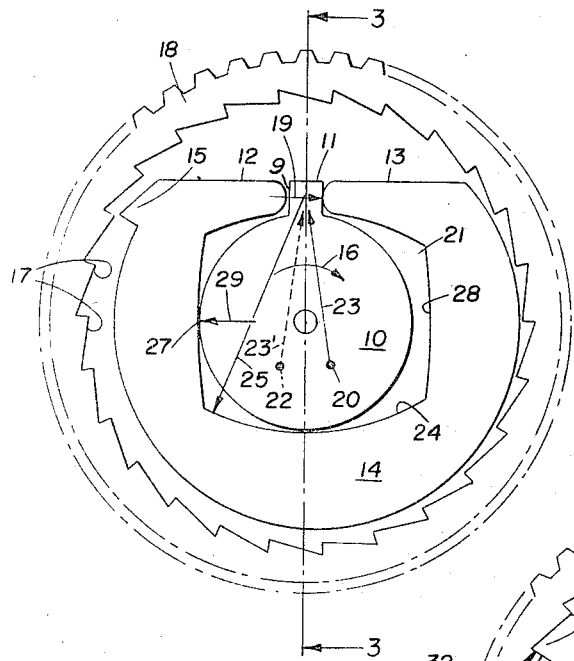
FIG· 1
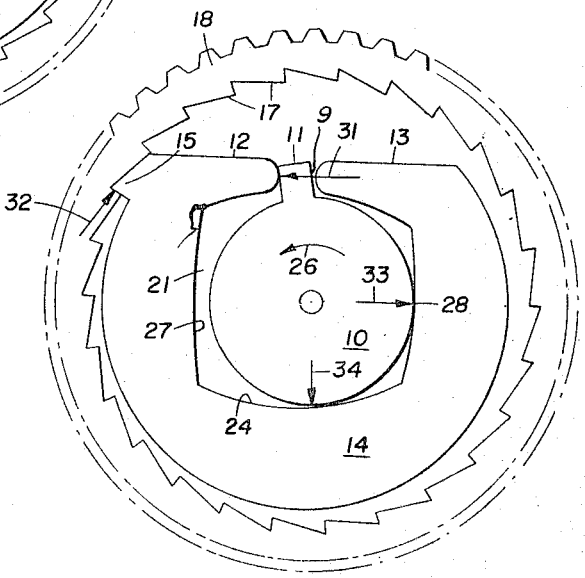
FIG· 2
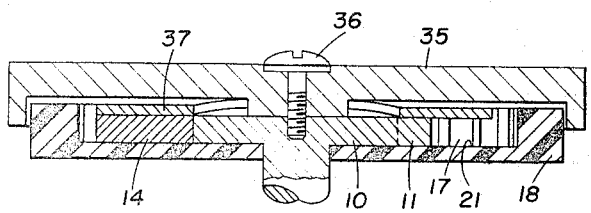
FIG· 3
DEAN M· PETERSON
CHARLES E· PICKERING
WILLIAM WINDLE, JR·
         INVENTORS
BY
         ATTORNEYS & nbsp;

3,300,003
UNIDIRECTIONAL CLUTCH MECHANISM
Dean M. Peterson, Charles E. Pickering, and William Windle, Jr., Rochester, N.Y., assignors to Eastman Kodak Company, Rochester, N.Y., a corporation of New Jersey
Filed Nov. 25, 1964, Ser. No. 413,700
2 Claims. (Cl. 192—46)

The present invention relates to a unidirectional clutch mechanism and more particularly to a clutch mechanism which positively drives in one direction and provides substantially no torque in the other direction.

Unidirectional clutches of several types are well known. For instance, a usual ratchet clutch rotates a flexible or reciprocating pawl so that it sequentially engages a plurality of teeth with a clicking noise when driven in one direction, or drivingly engages a single tooth when driven in the other direction. Also various cinching rollers are used to attain unidirectional driving forces. The ratchet clutch, although usually much noisier is often more simple in construction and less subject to wear. However, the clicking noise is both objectionable and tends to cause frictional wear of the parts as well as some drag force.

Therefore, it is an object of the present invention to provide an improved unidirectional clutch mechanism operating on ratchet principles without the usual clicking noise.

In accordance with one embodiment of our invention a key shaped shaft drivingly engages a washer pawl within an internally ratcheted gear. The pawl is a free-floating split washer like construction having a pawl tooth adjacent to the key of the driving shaft. When turned in one direction the pawl tooth is withdrawn from the ratchet teeth because of its inertia moment including its center of gravity, being other than near the key of the shaft. Conversely, when driven in the other direction the pawl tooth drivingly engages one of the ratchet teeth also because of the dissymmetry of the point of application of the force compared to the inertia moment of the pawl.

The subject matter which is regarded as our invention is particularly pointed out and distinctly claimed after the concluding portion of this specification. The invention, however, as to its organization and operation together with further objects and advantages thereof, will best be understood by reference to the following description taken in connection with the accompanying drawing, in which:

FIG. 1 is a simplified plan view of one embodiment of our invention with the pawl tooth withdrawn from the ratchet teeth;

FIG. 2 is a view of our invention with the pawl tooth engaging one of the ratchet teeth; and FIG. 3 is a cross section view taken along the line 3—3 of FIG. 1.

Referring now to the drawing, wherein like numbers indicate similar parts, we have shown in FIG. 1 a drive shaft 10 having thereon an off-center pawl driving means shown as a key 11 which engages selectively ends shown as tines 12 and 13 of a rigid split washer pawl 14. The tines 12, 13 are spaced to form a split portion 9 for receiving key 11. Adjacent to the key 11, on the periphery of pawl 14, is a pawl tooth 15 which, when shaft 10 is driven in the direction indicated by an arrow 16, is withdrawn from the ratchet teeth 17 on the inner periphery of a cup-shaped ratchet gear 18 in response to a force 19 at the key 11. This force 19 acts directly on the tine 13.

The particular pawl indicated may take the form of a solid brass split washer punching having a uniform thickness of the order of .060″. When the pawl is a uniform thickness, its center of gravity is at a point indicated as 20 when the shaft 10 is rotated in the direction as shown by the arrow 16. Also the mean average of frictional coupling between the pawl 14 and the lower surface 21 of the gear 18 is at some distance from the key 11 and for the purposes of the present discussion may be assumed to be at the center of gravity. When the shaft rotation is reversed as indicated by an arrow 26 in FIG. 2 the center of gravity of the pawl 14 moves to the position indicated in dashed line at 22 (FIG. 1). Thus the drive radii 23 and 23′ which cause the pawl tooth 15 to move in and out of engagement are substantially greater than the effective radius of key 11 on the shaft 10.

The radius of curvature of an inner surface 24 of the pawl 14 opposite the key 11 indicated by an arrow 25 is such that the pawl may rotate about the key 11 until one of the surfaces 27 or 28 engages the periphery of the shaft 10. In FIG. 1 the surface 27 so engages the shaft whereby no surface of the pawl including the pawl tooth 15 engages even the tip of any of the ratchet teeth 17. Thus the ratchet clicking noise is completely avoided and no wear of teeth 17 occurs when the clutch is operated in the slipping direction. The major reaction to the force 19 occurs as a force 29 between the surface 27 and the shaft 10.

Also the surface 28 limits motion of the pawl 14 so that only the tooth 15 makes contact with one of the teeth 17. As shown in FIG. 2 a driving force 31 at the key 11 when the shaft 10 is being rotated in a direction indicated by the arrow 26 drives the tine 12 so that the pawl tooth 15 is driven into engagement with one of the ratchet teeth 17. Thus, rotation of the shaft 10 in the direction indicated by the arrow 26 developes a solid driving force. It should be noted that the driving force 31 of the key causes the pawl tooth 15 to move all the way into a detent of one of the ratchet gear teeth 17 prior to developing a firm driving coupling. When the driving force 31 is in effect reactions occur as indicated by an arrow 32 at the pawl tooth 15, arrow 33 at the surface 28 and arrow 34 at the surface 24.

Referring now to FIG. 3, we have shown the pawl 14 as being captive in a chamber including the cup-shaped ratchet gear 18 and a cap member 35 secured to the shaft 10 by a bolt 36 or the like. Thus rotation of the cap 35 bidirectionally will drive the shaft 10 to rotate the ratchet gear 18 unidirectionally in the usual manner of such a unidirectional drive system.

We have found that the bidirectional drive of the present invention, when held in certain positions other than horizontal can result in the gravity influence on the pawl 14 overcomig the effective radial drive of the key 11 compared to the center of gravity of the pawl (20–22). To eliminate this possibility we prefer to add a wafer spring 37 which will increase the frictional contact between one of the side surfaces of pawl 14 and the lower surface 21 of the ratchet gear 18 to thus augment the effective radial force developed at the key 11 and completely counteract the loss of driving force which sometimes occurs because of gravity. Although the wafer spring 35 is preferred in applications where the present invention is to be used in vertical mounted positions, it is not necessary in those applications where it is to be mounted horizontally.

While we have shown and described particular embodiments of the present invention, other modifications may occur to those skilled in this art. For instance, the washer pawl need not be split as shown, but addition of substantial material above the key 11 raises the centers of gravity 20 and 22 to shorten the drive radius 23 unnecessarily. Also, this clutch may be operated effectively by rotating the ratchet gear 18 to drive the shaft 10 if such operation is preferred. We intend, therefore, to have the appended claims cover all modifications which fall within the true spirit and scope of our invention.

We claim:
1. A unidirectional clutch comprising:
   a rotatable drive shaft having a drive key extending therefrom;
   a gear coaxial with said shaft and having ratchet teeth on its inner periphery; and
   a substantially U-shaped washer pawl substantially surrounding said drive shaft and having an outwardly extending pawl tooth, said pawl having its ends spaced to form a split portion in the region of said key for receiving said key, said outer periphery of said pawl opposite said split portion being unsupported at all times, said pawl having inner surfaces relatively positioned to the outer periphery of said shaft allowing limited radial movement therebetween such that the pawl tooth will conditionally engage one of said ratchet teeth during rotation of said drive shaft in one direction and is completely withdrawn from said ratchet teeth during rotation in the opposite direction.

2. A unidirectional clutch as in claim 1 wherein said pawl has a flat side surface and said gear is cup-shaped to frictionally engage said side surface of said pawl, said clutch further having spring means for biasing said side surface of said pawl against said gear whereby the effective frictional force therebetween enhances the driving of the pawl tooth into and out of driving engagement by the key irrespective of gravitational forces acting on said pawl.

References Cited by the Examiner

UNITED STATES PATENTS

| 351,238 | 10/1886 | Williams | 192—46 |
| 710,593 | 10/1902 | Medley | 192—46 |
| 716,041 | 12/1902 | Houghtalins | 192—46 |
| 2,306,258 | 12/1942 | Kreis | 192—46 X |

DAVID J. WILLIAMOWSKY, *Primary Examiner.*

BENJAMIN W. WYCHE, *Examiner.*